US010460853B2

(12) United States Patent
Jones et al.

(10) Patent No.: US 10,460,853 B2
(45) Date of Patent: Oct. 29, 2019

(54) POWER CABLE AND BUS BAR WITH TRANSITIONAL CROSS SECTIONS

(71) Applicant: FLEX-CABLE, Howard City, MI (US)

(72) Inventors: Tim Jones, Howard City, MI (US); Robert W. Christie, Howard City, MI (US); Jan Christiansen, Howard City, MI (US); Erwin Kroulik, Howard City, MI (US)

(73) Assignee: Flex-Cable, Howard City, MI (US)

( * ) Notice: Subject to any disclaimer, the term of this patent is extended or adjusted under 35 U.S.C. 154(b) by 0 days.

(21) Appl. No.: 15/603,026

(22) Filed: May 23, 2017

(65) Prior Publication Data

US 2017/0345526 A1 Nov. 30, 2017

Related U.S. Application Data

(60) Provisional application No. 62/340,893, filed on May 24, 2016.

(51) Int. Cl.

| | |
|---|---|
| *H01B 7/02* | (2006.01) |
| *H01B 7/08* | (2006.01) |
| *H01R 4/02* | (2006.01) |
| *H01R 4/72* | (2006.01) |
| *B60R 16/02* | (2006.01) |
| *H01B 9/00* | (2006.01) |
| *H01R 11/28* | (2006.01) |

(52) U.S. Cl.
CPC ............. *H01B 7/0823* (2013.01); *H01B 7/02* (2013.01); *H01R 4/023* (2013.01); *H01R 4/72* (2013.01); *B60R 16/0207* (2013.01); *H01B 9/006* (2013.01); *H01R 11/281* (2013.01); *H01R 2201/26* (2013.01)

(58) Field of Classification Search
CPC ........ H01B 7/0823; H01B 7/02; H01R 4/023; H01R 4/72; B60R 16/0207
USPC ...................................................... 174/128.1
See application file for complete search history.

(56) References Cited

U.S. PATENT DOCUMENTS

| | | | |
|---|---|---|---|
| 4,992,625 A | 2/1991 | Izui et al. | |
| 5,767,442 A | 6/1998 | Eisenberg et al. | |
| 5,860,831 A * | 1/1999 | Roder .................. | H01R 4/2495 439/422 |
| 6,173,101 B1 | 1/2001 | Bourghelle et al. | |
| 8,604,343 B2 | 12/2013 | Nixon-Lane | |

(Continued)

*Primary Examiner* — Tremesha S Willis
(74) *Attorney, Agent, or Firm* — Avery N. Goldstein; Blue Filament Law PLLC (57) ABSTRACT

An electrical cable is provided with a rounded insulated electrical conductor that transitions to a flattened section to fit into areas where the rounded portion does not fit. A round electrical conductor transitions to a flattened section for electrical conduction routing via the undercarriage of a vehicle, for routing under the carpeting of the passenger compartment, or other confined spaces. The electrical cable may illustratively be used in an electric car application where distribution of electrical current from the battery compartment to the motor requires additional wiring in the vehicle not found in combustion based engines. The reduced vertical profile of the flattened section provides for additional clearance between the vehicle undercarriage and the road, or between the undercarriage frame and the interior passenger compartment carpet.

17 Claims, 14 Drawing Sheets

(56) References Cited

U.S. PATENT DOCUMENTS

| | | |
|---|---|---|
| 8,772,636 B2 | 7/2014 | Yamaguchi et al. |
| 9,196,392 B2 | 11/2015 | Hasegawa |
| 2003/0196829 A1 | 10/2003 | Booth et al. |
| 2006/0266541 A1 | 11/2006 | Hirata et al. |
| 2008/0008560 A1 | 1/2008 | Wakabayashi et al. |
| 2013/0057062 A1 | 3/2013 | Yoshida et al. |
| 2014/0216805 A1 | 8/2014 | Adachi et al. |
| 2014/0332267 A1 | 11/2014 | Tanaka et al. |
| 2015/0274095 A1 | 10/2015 | Inao et al. |
| 2016/0014851 A1 | 1/2016 | Gough |
| 2016/0031392 A1 | 2/2016 | Oga et al. |

* cited by examiner

Flat Solid Bus Bar

FIG. 3B

Flat Flexible Bus Bar

POWER CABLE AND BUS BAR WITH TRANSITIONAL CROSS SECTIONS

CROSS-REFERENCE TO RELATED APPLICATION

This application claims priority of U.S. Provisional Patent Application Ser. No. 62/340,893 filed May 24, 2016, which is incorporated herein by reference.

FIELD OF THE INVENTION

The present invention in general relates to electrical power distribution and in particular to a multi-strand rounded conductor with a flattened section.

BACKGROUND OF THE INVENTION

A bus bar distributes electrical power using a metallic strip or bar to conduct electricity. Bus bars are designed to reduce power loss contributed by the skin effect, where currents tend to only flow on the outer surface of the conductor, by using a larger surface area compared to wires. The material composition and cross-sectional size of the bus bar determines the maximum amount of current that can be safely carried. Bus bars are typically formed from conductors including copper, brass, or aluminum, and are designed to conduct high current loads. Bus bars are produced in a variety of shapes such as flat strips, solid bars and rods, solid or hollow tubes, twisted wires, and braided wire. Some of these shapes allow heat to dissipate more efficiently due to their high surface area to cross-sectional area ratio. The skin effect makes 50-60 Hertz (Hz) alternating current (AC) bus bars more than about 8 millimeters (0.31 in) thickness inefficient, so hollow or flat shapes are prevalent at high frequencies in higher current applications. A bus bar may either be supported on insulators, or else insulation may completely surround the bus bar. Bus bars may be connected to each other and to electrical apparatus by bolted, clamped, thermal bond, or welded connections. Often, joints between high-current bus sections have precisely-machined matching surfaces that are silver-plated to reduce the contact resistance.

Bus bars are often used in assemblies and applications where the bus bar is required to make extreme twists and bends to make required electrical connections in a limited space. In addition, a flattened rectangular cross section is often required for applications where a traditional round conductor, twisted wire conductor, or braided conductor would not fit, such as in electric vehicle applications.

Thus, there exists a need for an electrical conducting cable that transitions from a round cross section to a flat cross sectional area to negotiate tight spaces where a rounded conductor would not fit.

SUMMARY OF THE INVENTION

A cable assembly includes a first section of an electrical conductor with a circular or oval cross section, and a second section of the electrical conductor forming a transitional area where the electrical conductor changes from the circular or oval cross section to a third section of the electrical conductor with a square or rectangular cross section.

An electrical cable for an electric vehicle includes a first section of an electrical conductor with a circular or oval cross section that connects to a battery, and a second section of the electrical conductor forming a transitional area where the electrical conductor changes from the circular or oval cross section to a third section of the electrical conductor with a square or rectangular cross section, where the third section runs along an undercarriage of the electric vehicle or under a layer of carpeting in a vehicle passenger compartment.

A method of forming a flattened multi strand electrical cable from a circular multi-strand electrical cable includes removing a section of insulator from the multi-strand electrical cable, untwisting a series of twisted strands that form the multi-strand electrical cable, and separating the untwisted series of strands. The separated and untwisted series of strands are placed in die in a press and pressure is applied to the die to flatten the series of strands. A second insulator is applied to the flattened series of strands, and a strain relief is applied to one or more transition areas between the circular multi-strand electrical cable and the untwisted and flattened series of strands.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
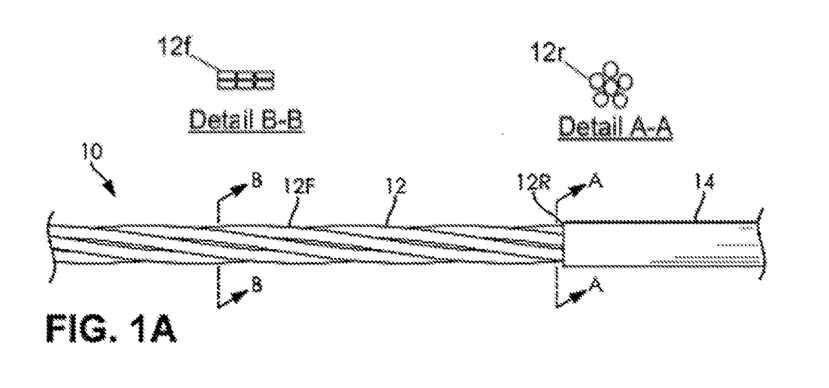
FIG. 1A illustrates a side perspective view of a twisted multi-strand wire conductor flattened in accordance with embodiments of the invention.
Figure 1B:
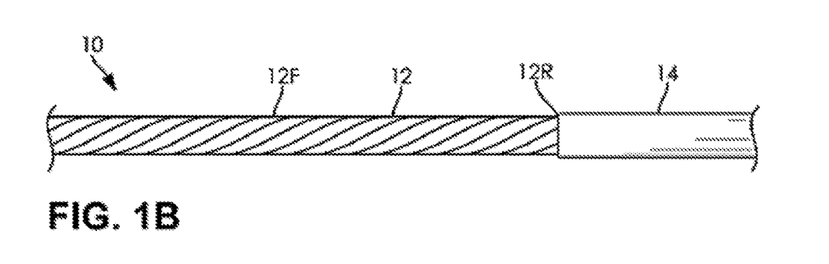
FIG. 1B illustrates a top perspective view of a twisted multi-strand wire conductor of FIG. 1A flattened in accordance with embodiments of the invention.
Figure 1C:
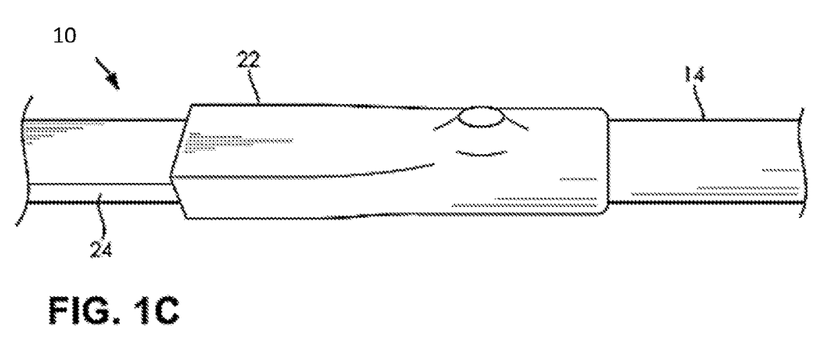
FIG. 1C illustrates a perspective view of an embodiment of the inventive electrical conductor with a section of the flattened twisted multi-strand wire of FIG. 1B with a transitional strain relief over a portion of the twisted multi-strand wire conductor where the round cross section of the insulated conductor transitions to the flattened twisted multi-strand wire where the flattened twisted multi-strand wire is covered in a second insulator in accordance with embodiments of the invention.

The present invention has utility as an electrical cable with a rounded insulated electrical conductor that transitions to a flattened section to fit into areas where the rounded portion does not fit. In a specific embodiment a round electrical conductor transitions to a flattened section for electrical conduction routing via the undercarriage of a vehicle, for routing under the carpeting of the passenger compartment, or other confined spaces. Embodiments of the inventive electrical cable may illustratively be used in an electric car application where distribution of electrical current from the battery compartment to the motor requires additional wiring in the vehicle not found in combustion based engines. The reduced vertical profile of the flattened section provides for additional clearance between the vehicle undercarriage and the road, or between the undercarriage frame and the interior passenger compartment carpet Referring now to the figures, FIGS. 1A-1C illustrate an electrical cable 10 with a twisted multi-stranded conductor 12 that transitions from a round cross section 12R to a flattened cross section 12F. As best shown in cross sectional details A-A and B-B of FIG. 1A, the individual strands of the twisted conductor 12 are flattened from round or oval 12r to square or rectangular 12f. In a specific embodiment, the strands of the conductor 12 are untwisted, separated, and flattened under pressure in a die placed in a press. The untwisting of the strands lessens stress on the conductors 12, as when pressing the cable the center of the cable is pressed harder and work hardened, and the center portion of the conductor will break sooner if flexed. In addition, the untwisting of the strand provides for a more compact layering of the strands. The conductors 12 may include copper, brass, aluminum, or other alloys. As shown in FIG. 1C the round portion of the cable 10 has an insulating cover 14, the transitional area has a transitional cover 22 that changes from round or oval to square or rectangular, and the flattened square or rectangular section is covered by insulator 24. The insulators 14, 22, and 24 may be illustratively be made of plastic, polyvinyl chloride (PVC), polyethylene, Santoprene™ thermoplastic vulcanizates (TPV), thermoplastic elastomers (TPE), tetrafluoroethylene/fluoropolymer (TFE), polypropylene, polycarbonate, olefins, nylon, styrene, urethane, acrylonitrile butadiene styrene (ABS), or rubber. The transitional cover 22 may be rigid or flexible, and may be designed to withstand exposure to extreme high or low temperatures (−40° C. to 125° C.), moisture, as well as harsh chemicals, oils, and road salts experienced in a vehicle operation context. Chemical resistance is readily measured using ASTM D543. In a specific embodiment, the transitional cover 22 may be over molded or formed with a heated shrink wrap, or vacuum formed part sealed together.

Figure 2:
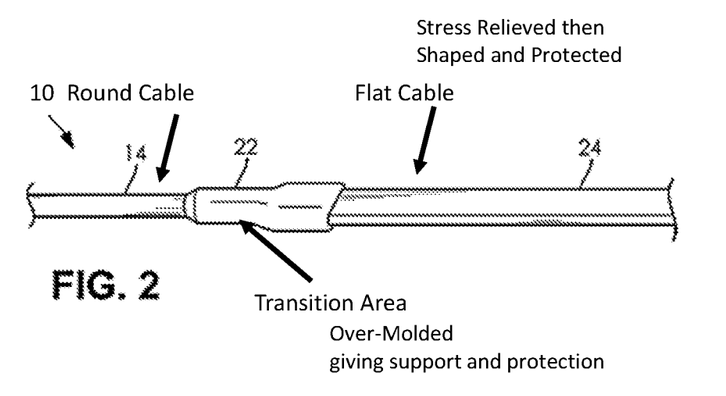
FIG. 2 illustrates a perspective view of the electrical cable of FIG. 1C in accordance with an embodiment of the invention.

FIG. 2 illustrates an additional perspective view of the electrical cable 10 that shows the transition from round conductor 12 covered in insulator 14 to flat cross section conductor covered 12F with insulator 24. It is appreciated that more than one transition may occur with the cable 10, such as from round to flat and back to round. The number and placement of the transitions may be repeated as required by a specific application.

Figure 3A:
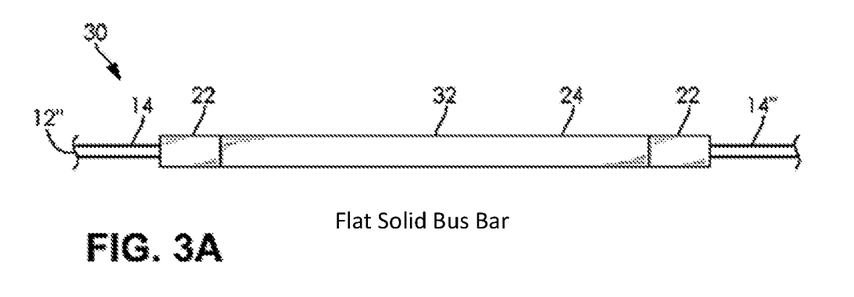
FIG. 3A illustrates a flat rigid solid bus bar with both ends of the flat rigid solid bus bar transitioning into a rounded conductor in accordance with an embodiment of the invention.

FIG. 3A illustrates a conductor assembly 30 with a flat rigid solid bus bar 32 with both ends of the flat rigid solid bus bar 32 transitioning into a rounded conductor 12" covered with insulator 14, where the rounded conductor 12" may be made of two or more separate strands (i.e., 12) or of a single conductor 12'. In specific embodiments, the transitional cover 22 may be over molded or formed with a heated shrink wrap.

Figure 3B:
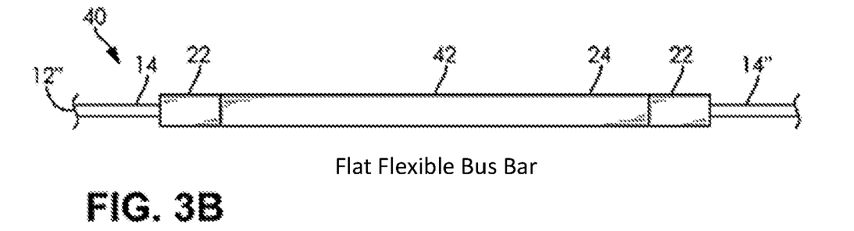
FIG. 3B illustrates a flat flexible bus bar with both ends of the flat flexible bus bar transitioning into a rounded conductor in accordance with an embodiment of the invention.

FIG. 3B illustrates a conductor assembly 40 with a flat flexible bus bar 42, as disclosed in U.S. provisional application 62/307,089 filed 11 Mar. 2016 and incorporated herein in its entirety, with both ends of the flat flexible bus bar 42 transitioning into a rounded conductor 12", where the rounded conductor 12" may be made of two or more separate strands (i.e., 12) or of a single conductor 12'. In specific embodiments, the transitional cover 22 may be over molded or formed with a heated shrink wrap.

Figure 4A:
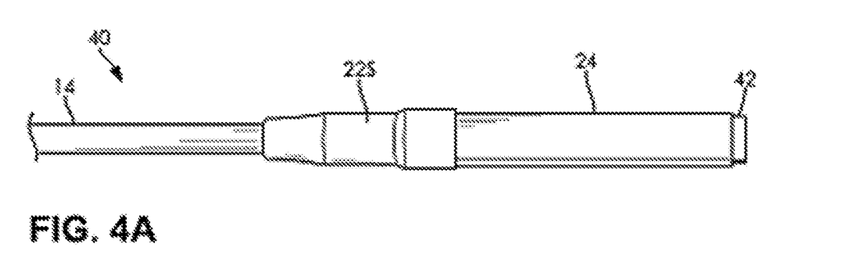
FIG. 4A illustrates a perspective view of a round cable conductor transitioning to a flat flexible bus bar with a shrink tube strain relief in the transition zone between the round cable conductor and the flat flexible bus bar in accordance with embodiments of the invention.

FIG. 4A illustrates a perspective view of the conductor assembly 40 of the round cable conductor 12" transitioning to the flat flexible bus bar 42 with a shrink tube strain relief 22S in the transition zone between the round cable conductor 12" covered with insulator 14 and the flat flexible bus bar 42 covered with insulator 24.

Figure 4B:
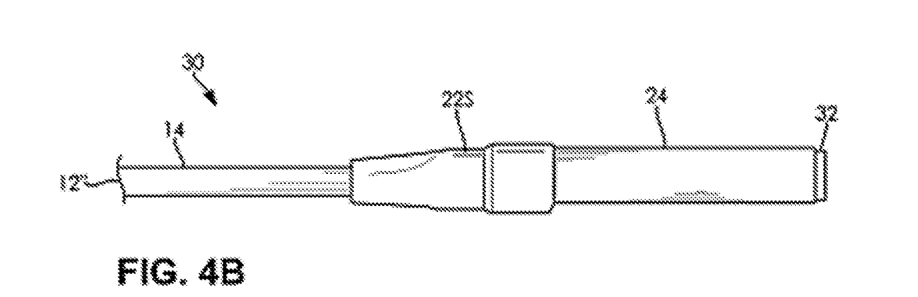
FIG. 4B illustrates a perspective view of a round cable conductor transitioning to a flat solid bus bar with a shrink tube strain relief in the transition zone between the round cable conductor and the flat solid bus bar in accordance with embodiments of the invention.

FIG. 4B illustrates a perspective view of the conductor assembly 30 of the round cable conductor 12" transitioning to the flat solid bus bar 32 with a shrink tube strain relief 22S in the transition zone between the round cable conductor 12" covered with insulator 14 and the flat solid bus bar 32 covered with insulator 24.

Figure 5A:
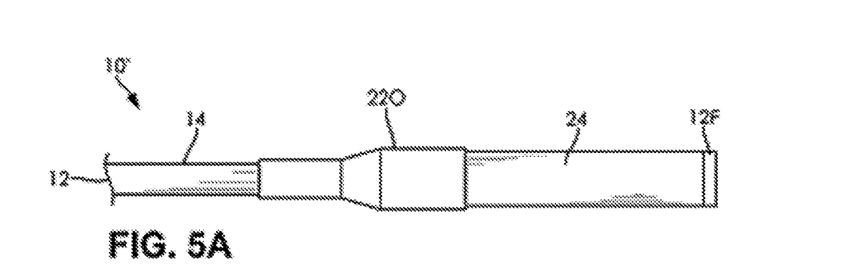
FIG. 5A illustrates a perspective view of a round cable conductor transitioning to a flattened wire with insolation added over the flat wire with an over molded strain relief in the transition zone between the round cable conductor and the flat wire in accordance with embodiments of the invention.

FIG. 5A illustrates a perspective view of a conductor assembly 10' of the round cable conductor with twisted strands 12 transitioning to an untwisted multi strand rectangular conductor 12F covered with insulator 24 with an over molded strain relief 22O in the transition zone between the round cable conductor 12 and the rectangular conductor 12F.

Figure 5B:
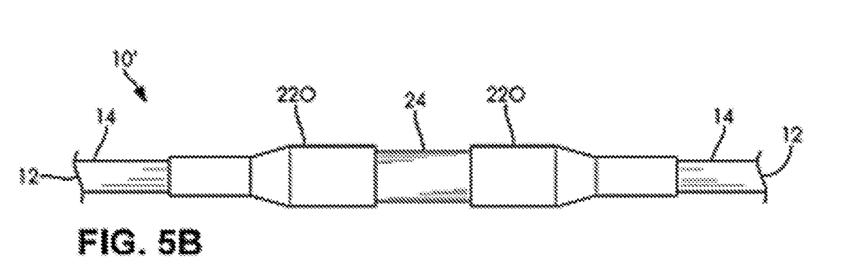
FIG. 5B illustrates a perspective view of a round cable conductor transitioning to a flat wire with an over molded strain relief in the transition zone between the cable conductor and the flat wire in accordance with embodiments of the invention.

FIG. 5B illustrates a perspective view of a conductor assembly 10" of the round cable conductor with twisted strands 12 transitioning to an untwisted multi strand rectangular conductor 12F covered with insulator 24 and back to a round multi stranded conductor 12 with an over molded strain relief 22O in the transition zones between the round cable conductors 12 and the rectangular conductor 12F.

Figure 6A:
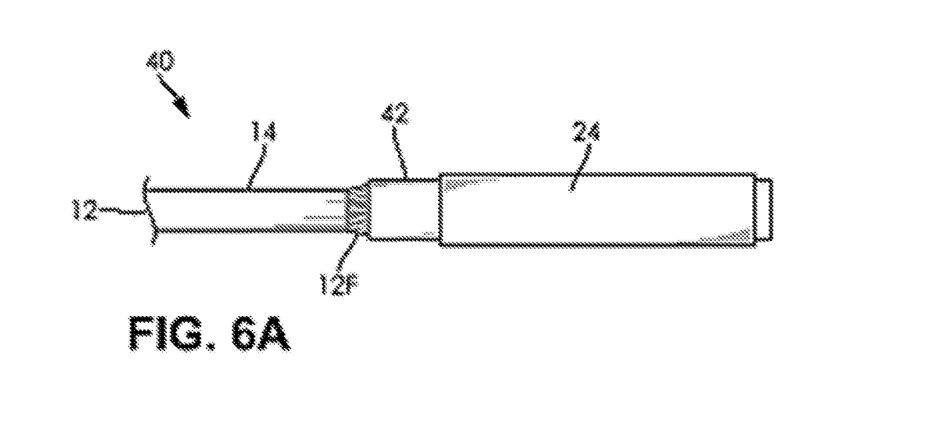
FIGS. 6A and 6B illustrate top and side perspective views, respectively, of a round cable conductor transitioning to a flat flexible bus bar with the strain relief removed in the transition zone between the cable conductor and the flat flexible bus bar in accordance with embodiments of the invention.
Figure 6B:
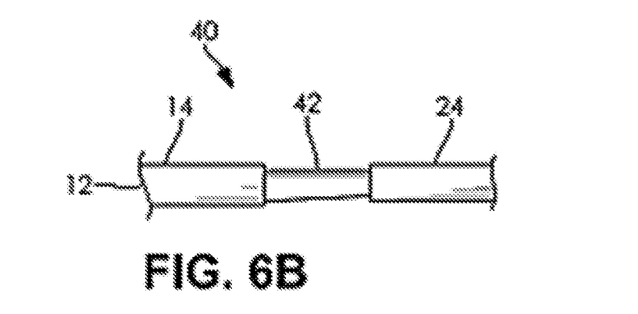

FIGS. 6A and 6B illustrate top and side perspective views, respectively, of a round cable conductor 12 transitioning to a flat flexible bus bar 42 with the strain relief removed in the transition zone between the cable conductor 12 and the flat flexible bus bar 42. The cable conductor 12 is flattened to become flattened conductor 12F and sandwiched between or soldered to the flat flexible bus bar 42.

Figure 7A:
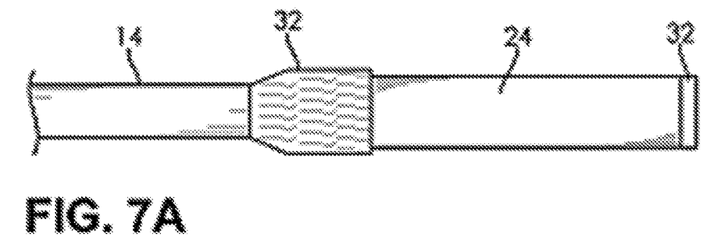
FIGS. 7A and 7B illustrate top and side perspective views, respectively, of a round cable conductor transitioning to a flat solid bus bar with the strain relief removed in the transition zone between the cable conductor and the flat solid bus bar in accordance with embodiments of the invention.
Figure 7B:
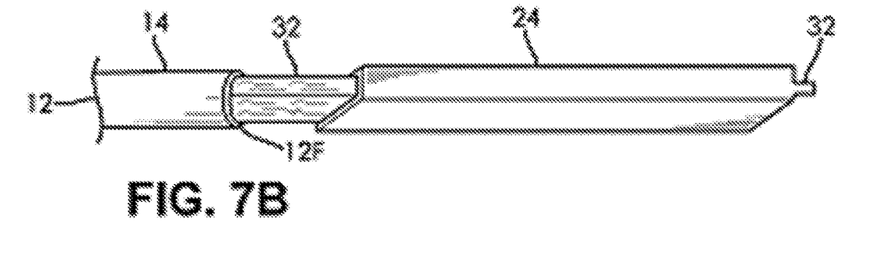

FIGS. 7A and 7B illustrate top and side perspective views, respectively, of a round cable conductor 12 transitioning to a flat solid bus bar 32 with the strain relief removed in the transition zone between the flattened cable conductor 12F and the flat solid bus bar 32.

Figure 8A:
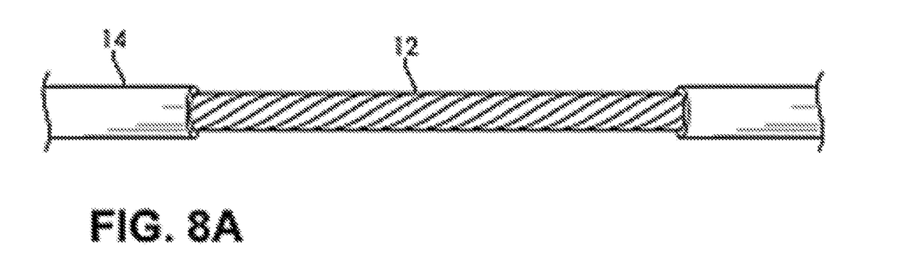
FIGS. 8A-8J illustrate a process of forming an electrical conductor with a section of flattened twisted multi-strand wire with a transitional strain relief over a portion of the twisted multi-strand wire conductor where the round cross section of the insulated conductor transitions to the flattened twisted multi-strand wire where the flattened twisted multi-strand wire is covered in a second insulator in accordance with embodiments of the invention.
Figure 8B:
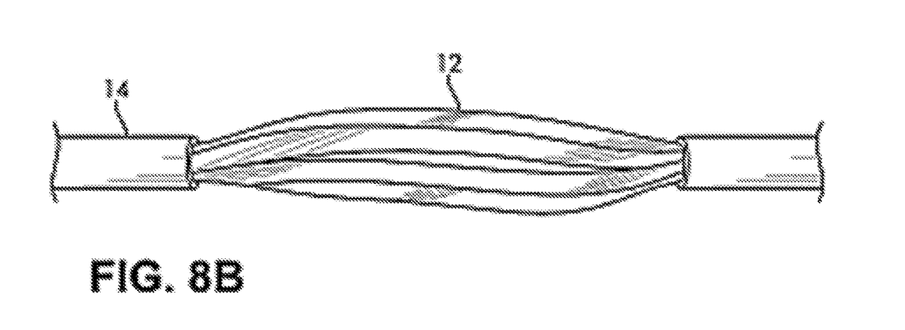
Figure 8C:
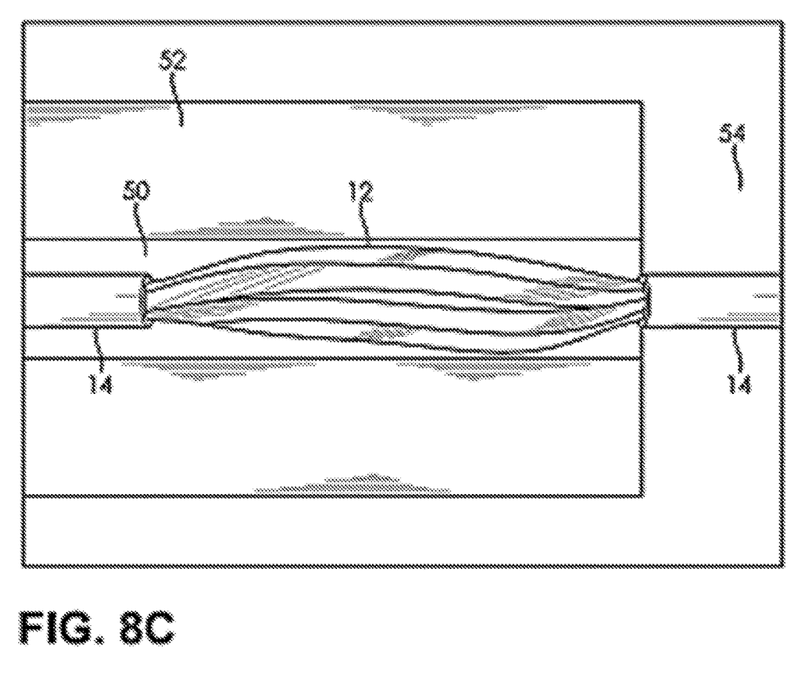
Figure 8D:
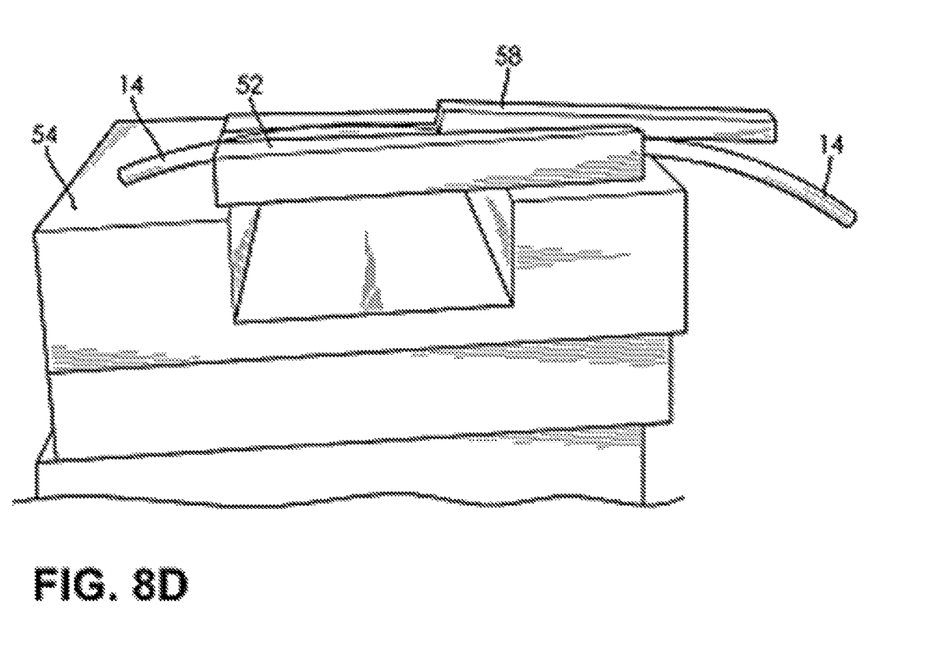
Figure 8E:
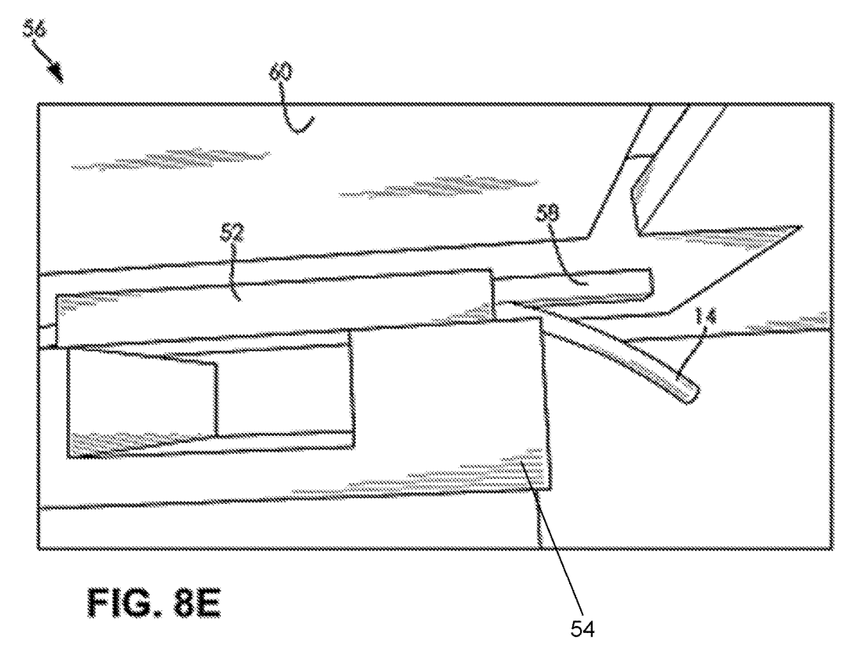
Figure 8F:
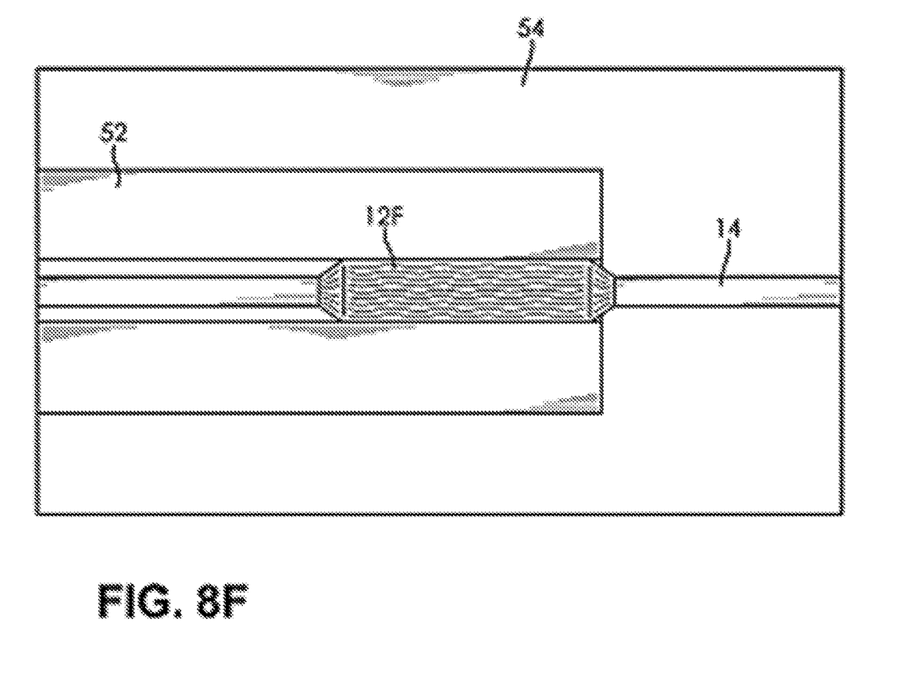
Figure 8G:
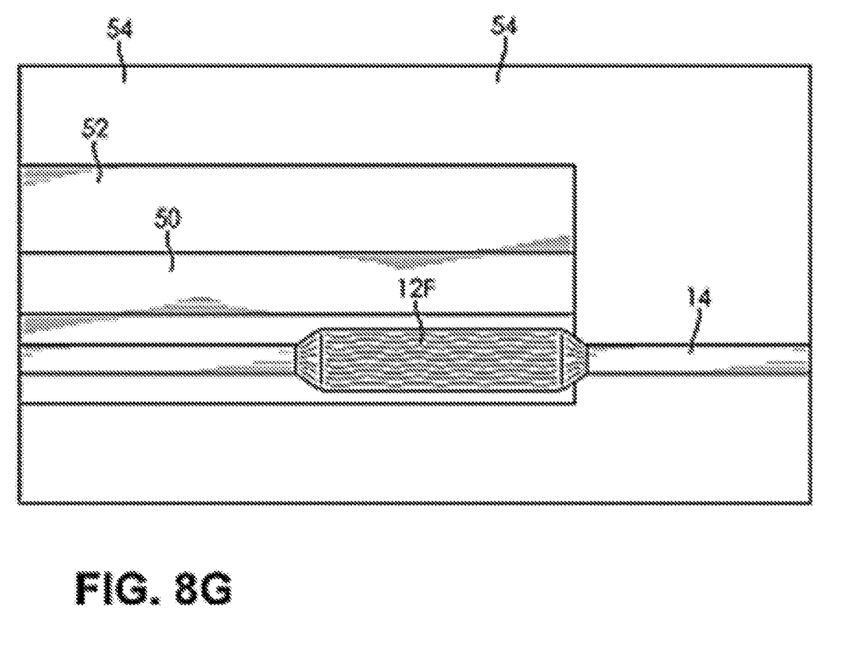
Figure 8H:
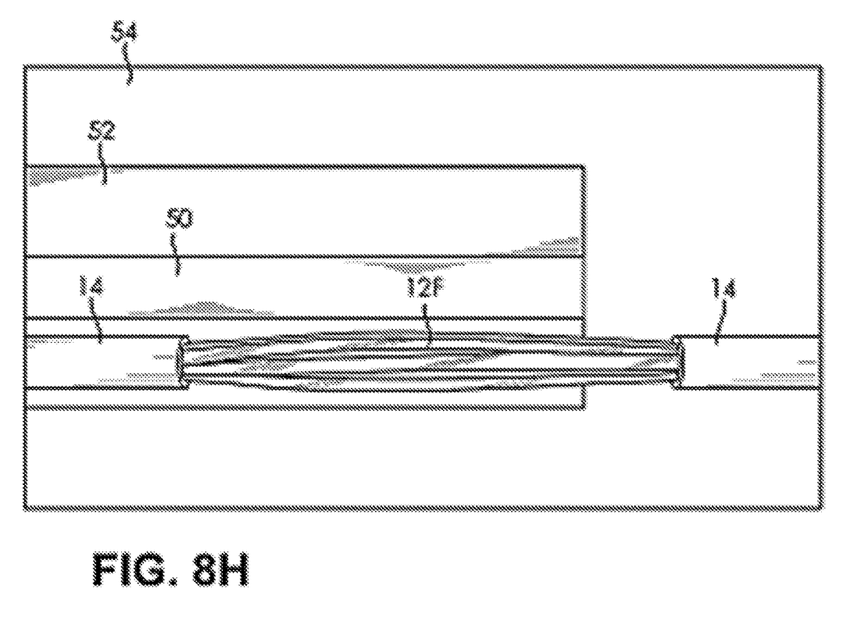
Figure 8I:
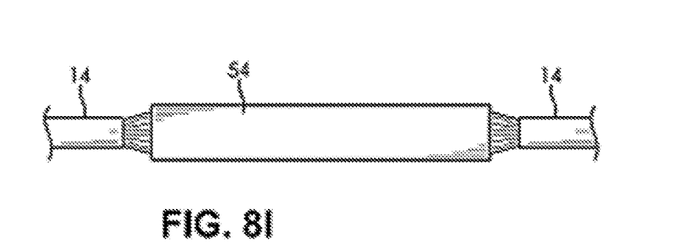
Figure 8J:
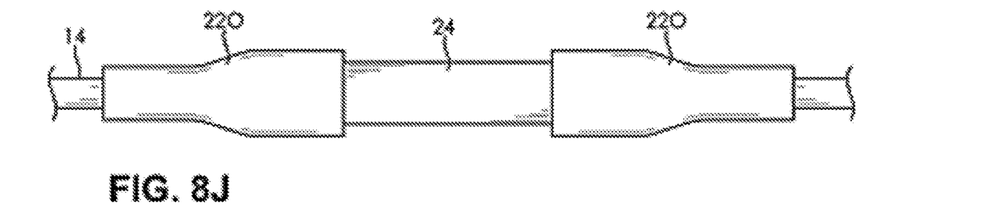

FIGS. 8A-8J illustrate a process of forming an electrical conductor assembly 10" as shown in FIG. 5B with a section of flattened twisted multi-strand wire 12F. A transitional strain relief 22O (over molded) is formed over the portions of the twisted multi-strand wire conductor 12 where the round cross section of the insulated conductor 12 transitions to the flattened twisted multi-strand wire 12F and the flattened twisted multi-strand wire 12F is covered in a second insulator 24. In FIG. 8A a portion of the insulator 14 is removed to exposed the twisted multi stand conductor 12. In FIG. 8B the conductors 12 are untwisted in the exposed section where the insulator 14 has been removed. In FIG. 8C the exposed section of the cable is placed in a channel 50 of form die 52 resting on a platen 54 of a press 56 (see FIG. 8E). A secondary die 58 is placed above the cable in the channel 50 of form die 52 as shown in FIG. 8D. In FIG. 8E the upper platen 60 of press 56 is lowered, and presses the secondary die 58 into the channel 50, and flattens the conductors 12 to form the flat conductor portion 12F as shown in FIG. 8F with the secondary die removed after the pressing step of FIG. 8E. In FIG. 8G the cable is removed from the channel 50 of the form die 52, and a top view of the flattened multi strand conductor 12F is visible. In FIG. 8H a side view of the cable illustrating the thinner profile of the center section with the flattened multi strand conductor 12F as compared to the insulated rounded portions of the cable 14. FIG. 8I illustrates the insulator 24 applied about the flattened conductor 12F. In FIG. 8J the over molded strain relief 22O in applied in the transition zones between the round cable conductors 12 and the rectangular conductor 12F.

The foregoing description is illustrative of particular embodiments of the invention, but is not meant to be a limitation upon the practice thereof. The following claims, including all equivalents thereof, are intended to define the scope of the invention.

The invention claimed is:

1. A cable assembly comprising:
   a continuous electrical conductor formed of multi-strands of an electrically conductive material;
   a first section of said continuous electrical conductor in which said multi-strands of electrical conductor material are twisted and together form a circular or oval cross section;
   a third section of said continuous electrical conductor in which said multi-strands of electrical conductor material are untwisted and individually flattened and together form a square or rectangular cross section; and
   a second section of said continuous electrical conductor forming a transitional area in which the cross section of said continuous electrical conductor changes from the circular or oval cross section of said first section to the square or rectangular cross section of said third section.

2. The cable assembly of claim 1 further comprising a second transitional area where the cross section of said continuous electrical conductor changes from the square or rectangular cross section of said third section back to a circular or oval cross section of twisted multi-strands of said electrically conductive material in a fourth section of said continuous electrical conductor.

3. The cable assembly of claim 1 wherein said first section, said second section, and said third section are encased with a series of insulating covers.

4. The cable assembly of claim 3 wherein said series of insulating covers are made of one or more plastic of polyvinyl chloride (PVC), polyethylene, Santoprene thermoplastic vulcanizates (TPV), thermoplastic elastomers (TPE), tetrafluoroethylene/fluoropolymer (TFE), polypropylene, polycarbonate, olefins, nylon, styrene, urethane, acrylonitrile butadiene styrene (ABS), or rubber.

5. The cable assembly of claim 3 wherein each of said series of insulating covers are elastomeric.

6. The cable assembly of claim 3 wherein said series of insulating covers withstand exposure to extreme high or low temperatures (−40° C. to 125° C.).

7. The cable assembly of claim 3 wherein said series of insulating covers are chemical resistant as measured under ASTM D543.

8. The cable assembly of claim 1 wherein said multi-strands of electrically conductive material of said continuous electrical conductor comprises two or more strands.

9. The cable assembly of claim 8 wherein said two or more strands have a circular or oval cross section in said first section of said continuous electrical conductor with the circular or oval cross section, and where the two or more strands each have a square or rectangular cross section in said third section of said continuous electrical conductor with the square or rectangular cross section.

10. The cable assembly of claim 1 wherein said electrical conductor is made from at least one of copper, brass, or aluminum.

11. An electrical cable for an electric vehicle comprising:
    a continuous electrical conductor formed of multi-strands of an electrically conductive material;
    a first section of said continuous electrical conductor in which said multi-strands of electrical conductor material are twisted and together form a circular or oval cross section, an end of said first section configured to connect to a battery;
    a third section of said continuous electrical conductor in which said multi-strands of electrical conductor material are untwisted and individually flattened and together form a square or rectangular cross section; and
    a second section of said continuous electrical conductor forming a transitional area in which the cross section of said continuous electrical conductor changes from the circular or oval cross section of said first section to the square or rectangular cross section of said third section, where the third section runs along an undercarriage of the electric vehicle or under a layer of carpeting in a vehicle passenger compartment.

12. The electrical cable of claim 11 further comprising a second transitional area where the cross section of said continuous electrical conductor changes from the square or rectangular cross section of said third section back to a circular or oval cross section of twisted multi-strands of said electrically conductive material in a fourth section of said continuous electrical conductor.

13. The electrical cable of claim 11 wherein said first section, said second section, and said third section are encased with a series of insulating covers.

14. The electrical cable of claim 13 wherein said series of insulating covers are made of one or more plastics of polyvinyl chloride (PVC), polyethylene, Santoprene™ thermoplastic vulcanizates (TPV), thermoplastic elastomers (TPE), tetrafluoroethylene fluoropolymer (TFE), polypropylene, polycarbonate, olefins, nylon, styrene, urethane, acrylonitrile butadiene styrene (ABS), or rubber.

15. The electrical cable of claim 13 wherein each of said series of insulating covers are elastomeric.

16. The electrical cable of claim 13 wherein said series of insulating covers withstand exposure to extreme high or low temperatures (−40° C. to 125° C.).

17. The electrical cable of claim 13 wherein said series of insulating covers are chemical resistant as measured under ASTM D543.

* * * * *